(12) United States Patent
Goldwitz (10) Patent No.: US 12,540,498 B2
(45) Date of Patent: *Feb. 3, 2026

(54) DOOR ALIGNMENT PIN BOLT WITH THE THREAD ON THE TOP

(71) Applicant: Brian Goldwitz, Waterbury, CT (US)

(72) Inventor: Brian Goldwitz, Waterbury, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/907,455

(22) Filed: Oct. 4, 2024

(65) Prior Publication Data
US 2025/0067098 A1    Feb. 27, 2025

Related U.S. Application Data (63) Continuation-in-part of application No. 18/136,344, filed on Apr. 19, 2023, now Pat. No. 12,100,371.

(51) Int. Cl.
*E05D 7/10*    (2006.01)

(52) U.S. Cl.
CPC ...... *E05D 7/1044* (2013.01); *E05Y 2201/682* (2013.01); *E05Y 2900/531* (2013.01)

(58) Field of Classification Search
CPC .................................................. E05D 7/1044
USPC .................................. 411/389; 16/262, 270
See application file for complete search history.

(56) References Cited

U.S. PATENT DOCUMENTS

| | | | | |
|---|---|---|---|---|
| 2,644,233 A | * | 7/1953 | Shmukler | A61C 11/02 433/66 |
| 2,741,289 A | * | 4/1956 | Grow | F16B 39/282 411/397 |
| 5,682,646 A | * | 11/1997 | Tyler, IV | E05D 5/062 16/386 |
| 5,987,703 A | * | 11/1999 | Kluting | E05D 5/121 16/386 |
| 7,922,433 B2 | * | 4/2011 | Ricciardo | F16B 39/10 411/161 |
| 8,066,320 B1 | * | 11/2011 | Grabowski | E05F 1/1223 16/334 |
| 8,556,330 B2 | * | 10/2013 | Lazarevich | E05D 7/1005 16/334 |
| 9,638,226 B2 | * | 5/2017 | Takahashi | F16B 5/0275 |
| 2003/0182761 A1 | * | 10/2003 | Kidd | E05D 5/121 16/386 |
| 2004/0244170 A1 | * | 12/2004 | Lehner | E05D 5/121 29/402.08 |
| 2006/0273621 A1 | * | 12/2006 | Shaw | E05D 7/121 296/146.11 |
| 2019/0032381 A1 | * | 1/2019 | Witting | F16B 37/08 |
| 2020/0087959 A1 | * | 3/2020 | Schabenberger | E05D 3/02 |

* cited by examiner

*Primary Examiner* — Kristina R Fulton
(74) *Attorney, Agent, or Firm* — Furr Law Firm; Jeffrey M. Furr (57) ABSTRACT

The current invention is vehicle door alignment pin bolts with a bolt thread on the top. The current invention will have two components, a door bolt with a thread on the top with an angled bolt cap in the middle and a bolt nut with an opening on the bottom that fits over the angled bolt cap. The allows for the reconnecting the door to the frame of the vehicle in a quicker and more efficient manner.

6 Claims, 12 Drawing Sheets

DOOR ALIGNMENT PIN BOLT WITH THE THREAD ON THE TOP

RELATED APPLICATIONS

This is a continuation-in-part of application Ser. No. 18/136,334 and filed on Apr. 18, 2023.

TECHNICAL FIELD

The technology discussed below relates to door bolts for removable doors and more particularly alignment pin bolts with the thread on the top and connected to the hinge.

BACKGROUND

The changes in technology and needed functionality with vehicles. This is especially true with vehicles like jeeps and SUVs.

Owners of jeeps and SUV (Sports Utility Vehicles with removable doors will remove and reconnect the doors. This can be difficult with the current art as a bolt needs to go through the hinge formed by the door hinge and the vehicle hinge. It is hard to align the bolt while holding the door to the vehicle frame. Doing this in the current art can scrap the paint off of the door and/or the frame. It can be time intensive as the bolt has to be aligned properly.

There is still room for improvement in the art.

SUMMARY

The current invention is vehicle door alignment pin bolts for removable doors and more particularly bolts with thread on the top and extending from the frame of the vehicle. The current invention will have two components, a door bolt with a thread on the top with an angled bolt cap in the middle and a bolt nut with an opening on the bottom that fits over the angled bolt cap.

These are improvements over the current art.

DETAILED DESCRIPTION

The illustrations presented herein are, in some instances, not actual views of any particular door hinge screws and devices or components thereof but may be idealized representations which are employed to describe the present disclosure. Additionally, elements common between figures may retain the same numerical designation.

The current invention is an improved car door alignment pin 1 as shown in FIGS. 3 through 19.

FIGS. 3 through 19 show a door alignment door pin 1 connected to the vehicle hinge 200 that can be used to easily move remove and attach a removable vehicle door 100.

Figure 1:
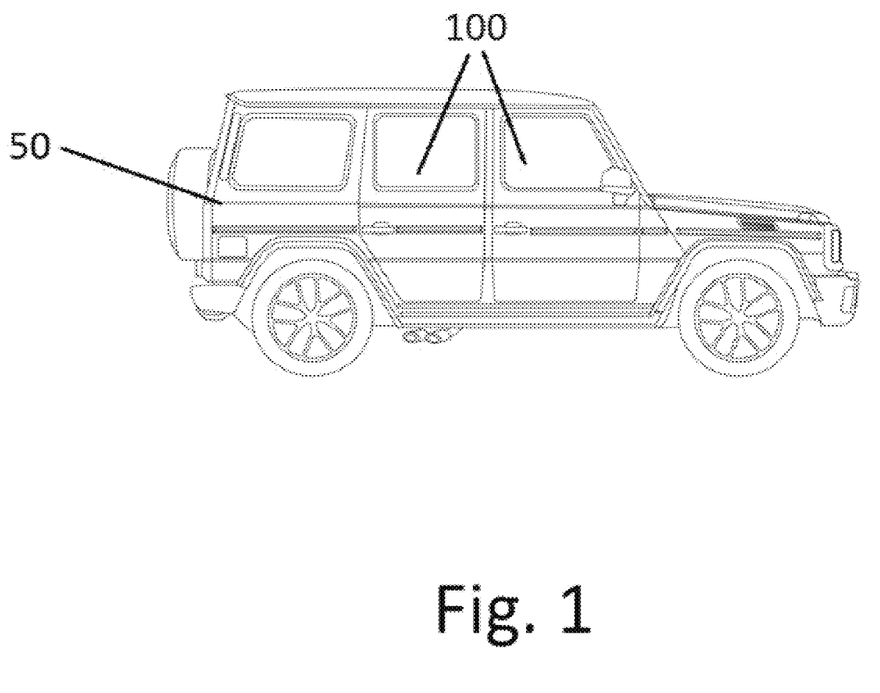
FIG. 1 is a view of a standard vehicle with removable doors.

FIG. 1 shows a vehicle 50 that has removable doors 100.

Figure 2:
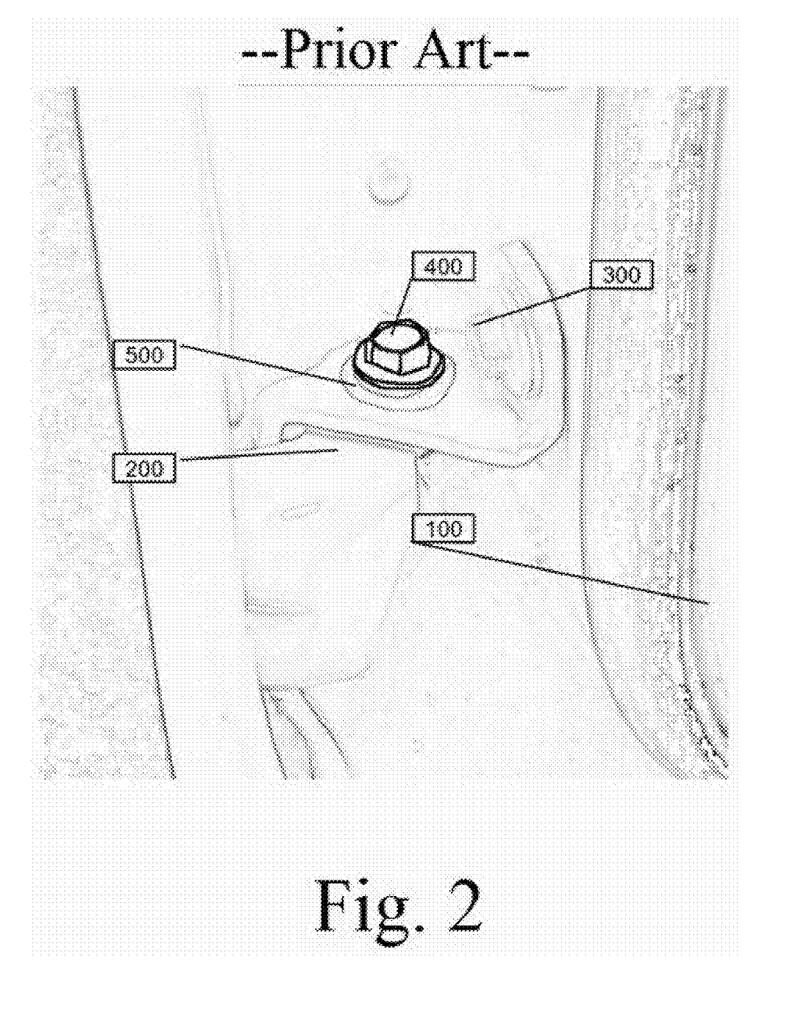
FIG. 2 is a view of prior art.

FIG. 2 shows the prior art where a single threaded bolt 400 is screwed into the threaded opening 320 holding the vehicle hinge 200 onto the vehicle hinge 200. This allows the door to pivot on the hinge assembly. It requires the door 100 to be held and aligned with the vehicle hinge 200 which can be challenging and difficult while making the hard to screw in the nut into the threaded opening 320 without hitting or denting the door 100 or the vehicle 50.

Figure 3:
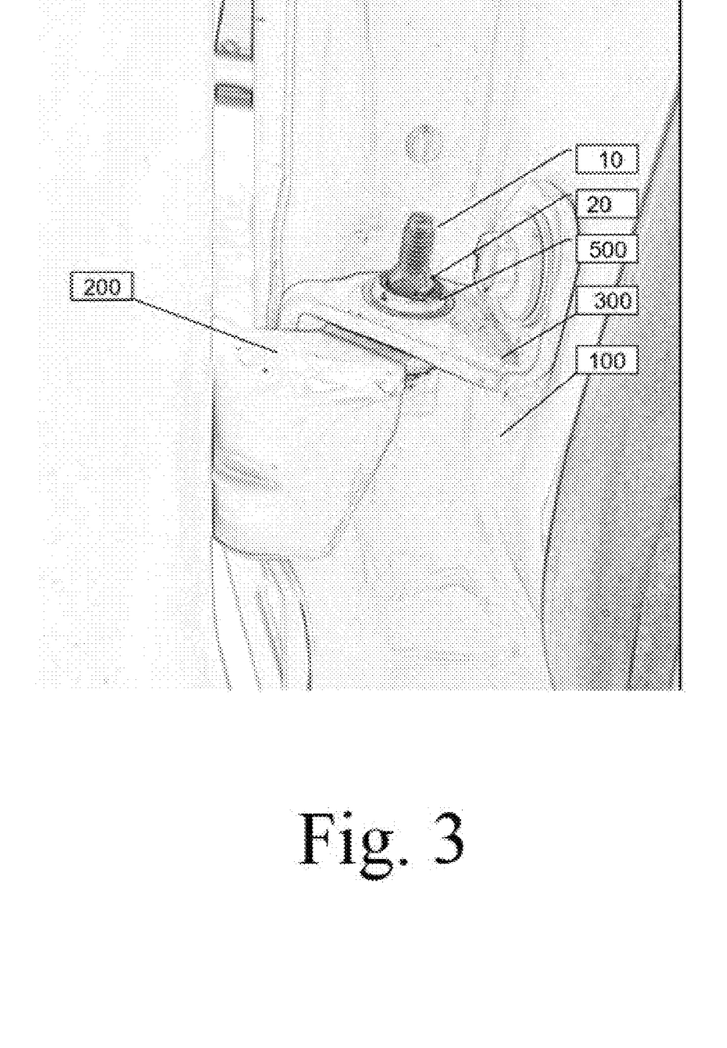
FIG. 3 shows a side view of the bolt.

FIG. 3 shows a close up of the hinge formed by the door hinge 300 and the vehicle hinge 200. The door hinge 300 is placed on the vehicle hinge 200. Where the door hinge 300 has a raised rim 500 that extends up from the plane 350 of the door hinge 300 with the raised rim 500 having the alignment door pin 1 attached to and extends up from the vehicle hinge 200. The vehicle hinge 200 has an upward vehicle rim 520 where the upward vehicle rim 520 extends up from the vehicle hinge 200 where there is a threaded circular opening 320. The door hinge 300 is placed through the alignment door pin 1 when connected to the vehicle hinge 200.

Figure 4:
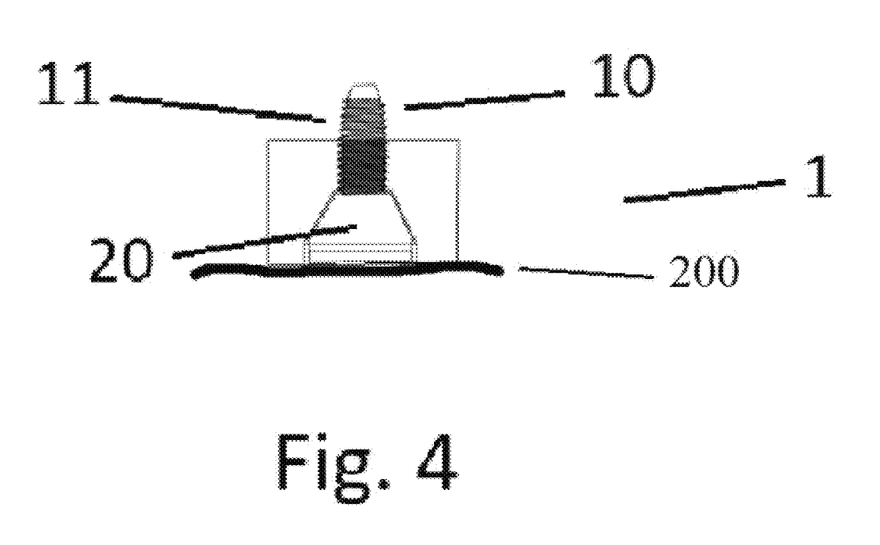
FIG. 4 is a view of the new invention bolt.

As shown in FIG. 4, the alignment door pin 1 is a threaded cylinder 10 with a threaded top 11 with a bolt block 20 positioned midway on the cylinder 10 where the threaded cylinder 10 extends up from the vehicle hinge 200.

In the preferred embodiment, the bolt block 20 has two flat sides 21 that are parallel to each other and two rounded sides 22 which are on opposite sides of each other as shown in FIG. 5A. The flat sides 21 allow a turning tool such as a wrench or even fingers to turn the bolt 10 into the threaded bolt hole 320 of the vehicle 50.

The rounded sides 22 angle inwardly up from the bottom of the bolt block 20 to top of the bolt block 20. This angled section will assist with the placement of the door hinge 100 onto the top of the bolt 11. The bolt block 20 can have a brim at the bottom that extends up a short distance to the angled section.

The bolt block 20 has a flat bottom as shown in FIG. 5A has a width between the rounded sides 22 is greater or equal to the diameter of the vehicle rim 520 and less than the diameter of the door rim 500.

Figure 5:
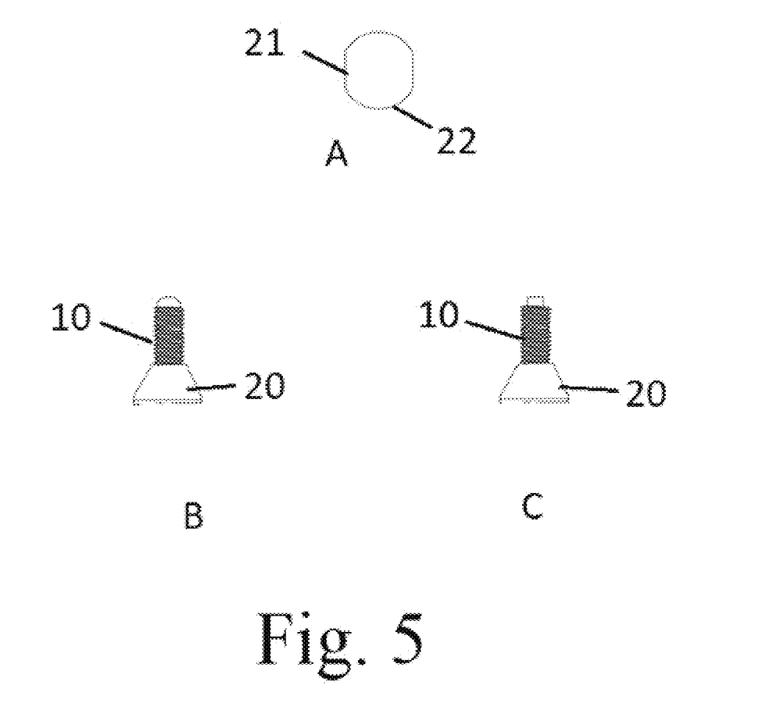
FIG. 5A-C shows views of the bolt with different shaped top end.
Figure 6:
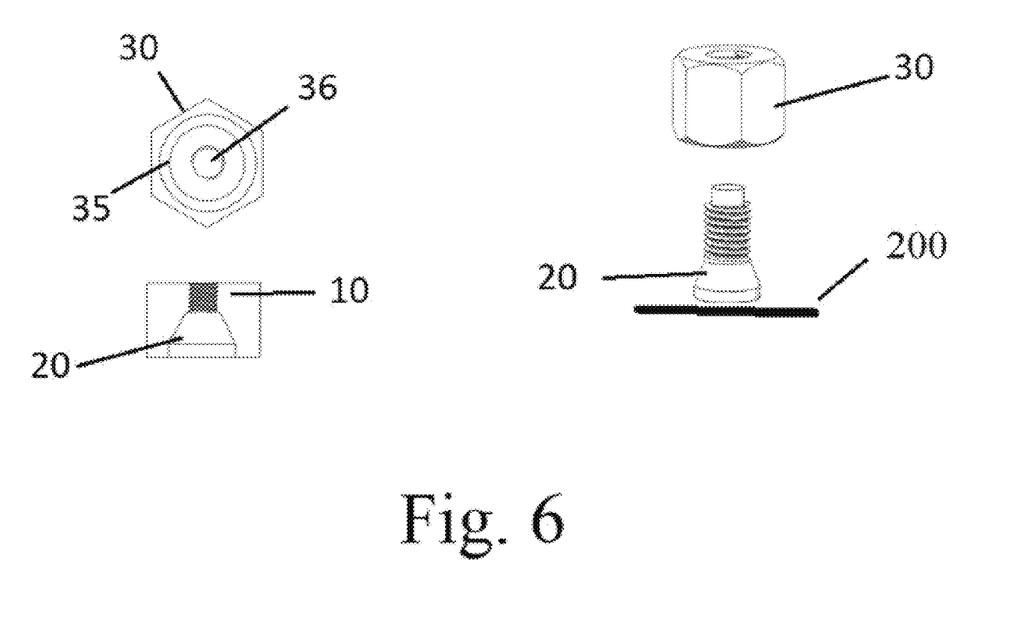
FIG. 6 shows a bottom and side view of the bolt nut and the angled block.
Figure 7:
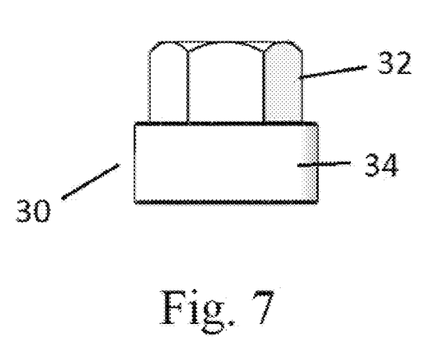
FIG. 7 is a side view of the bolt nut.
Figure 8:
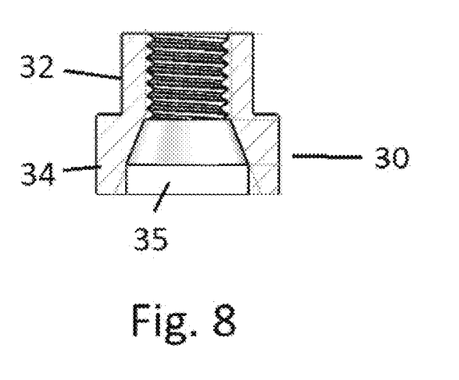
FIG. 8 is a cut away view of the bolt nut.

FIGS. 5 B through C show the potential different shapes of the bolt 10 including different end shapes. FIG. 6 should the bolt 1 extending up from the vehicle hinge 200 with the bolt block 20 extending up from the vehicle hinge 200 and the door holder nut 30.

Figure 9:
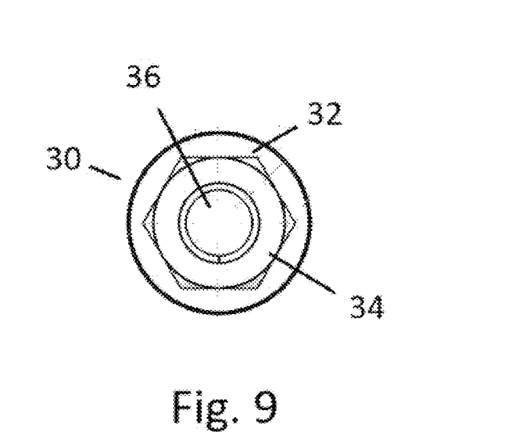
FIG. 9 show a top view of the bolt nut.
Figure 10:
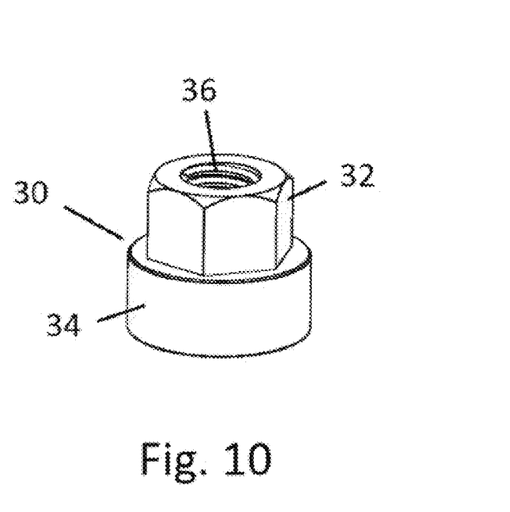
FIG. 10. is a front perspective view of the bolt nut.
Figure 11:
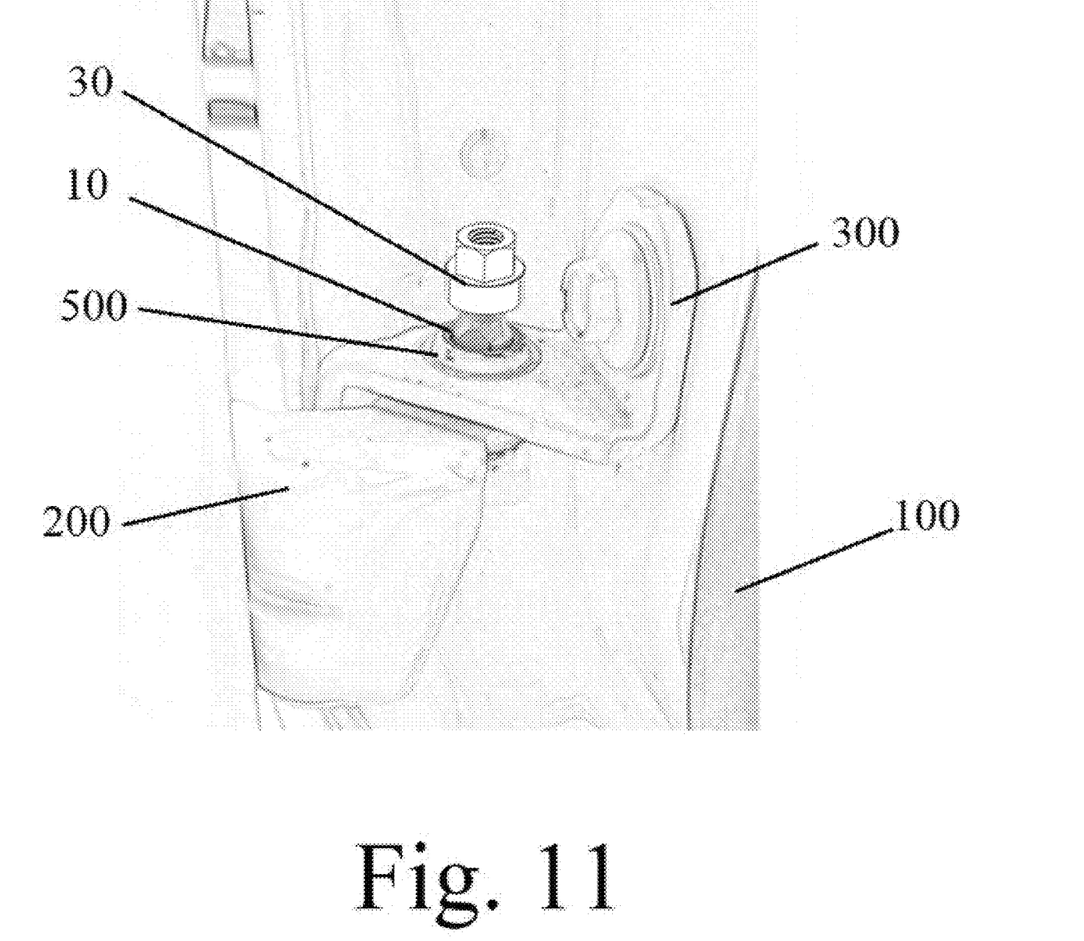
FIG. 11. shows the bolt nut being screwed on to the bolt.

The current invention will have a door holder nut 30. This door holder nut 30, as shown in FIGS. 7 through 10. will have the same thread size and will screw down on top thread of the bolt 10. As shown in FIGS. 6 and 9, the nut 30 will have a threaded hole at the top allowing it to be screwed on to the bolt 10. The nut 30 will have a hexadecimal top 32 in the preferred embodiment, although a square top or other shape can be used. The top 32 will be in a shape that a tool such as a wrench can be used to tighten the nut 30 on the bolt 10.

The bottom 34 of the nut 30 will be cylindrical where the bottom 34 extends out form the top 32 with a diameter that is the same or larger than the outer side of the door rim 510. The bottom 34 will have a recessed area that matches the shape of the curved parts of the bolt block 20 allowing the recessed area to fit over and cover the bolt block 20. This configuration allows the nut 30 to be screwed down on the upper thread of the screw 10 over the bolt block 20 securing the nut 30 against the door rim 510 thereby firmly attaching the door 100 to the vehicle 50.

The nut 30 and the bolt 10 will be made of a strong durable material in the preferred embodiment such as aluminum.

Figure 12:
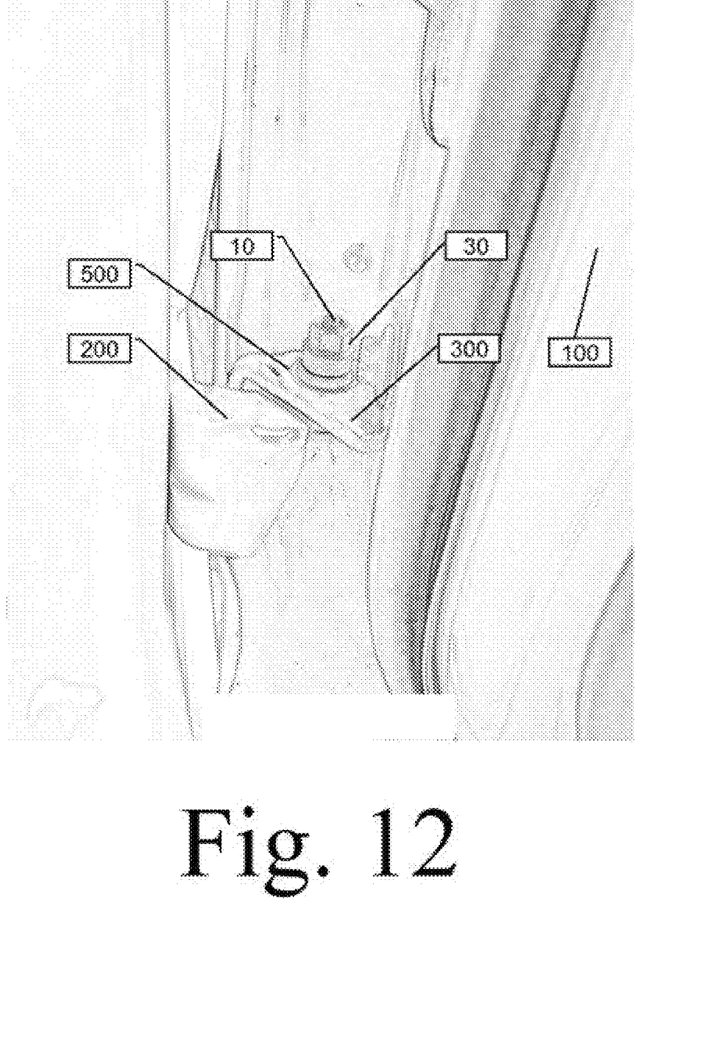
FIG. 12 shows the bolt nut in its securing position.

FIG. 12 shows the nut 30 being screwed onto the bolt 10 and the bolt block 20 of the bolt 10. FIG. 12 shows the nut 30 screwed down on the bolt 10 covering the bolt block 20 and flush against the door rim 510 securing the door 100 to the vehicle 50.

Figure 13:
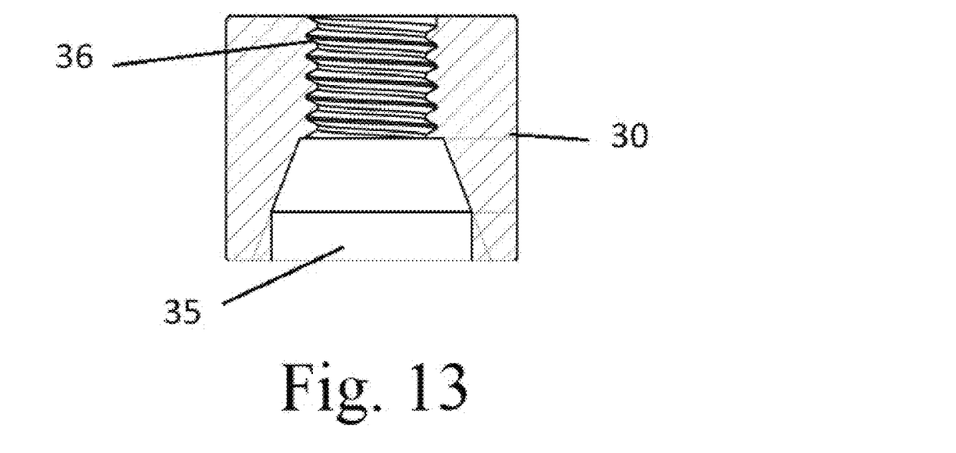
FIG. 13 shows a crosscut alternative embodiment of the bolt.
Figure 14:
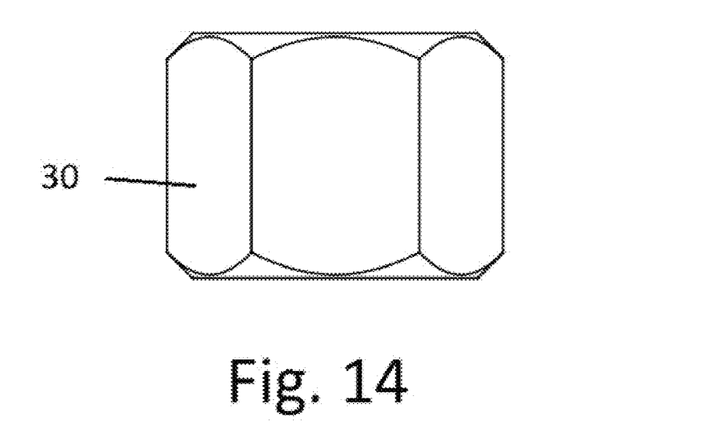
FIG. 14 is a side view of the bolt nut of FIG. 14.
Figure 15:
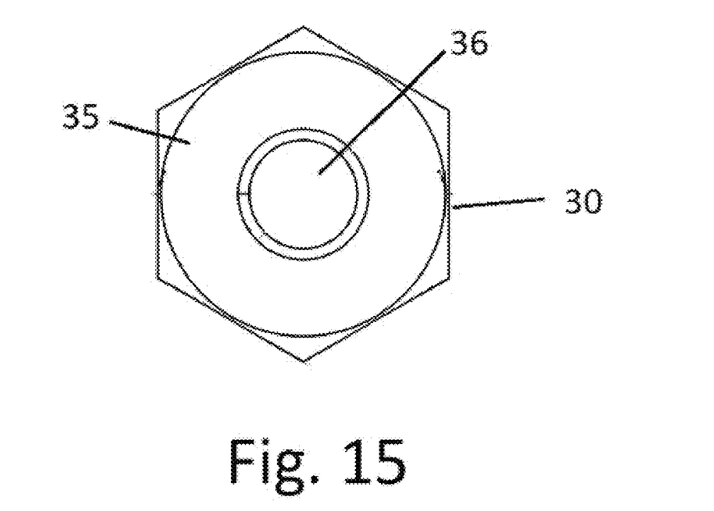
FIG. 15 show a top view of the bolt nut of FIG. 14.

An alternative embodiment of the nut is shown in FIGS. 13, 14, and 15. In this embodiment there is no cylindrical bottom, just the hexadecimal top. FIG. 13 shows a cross-section for the nut 30 with the threaded opening 36 and the recessed bottom 35.

Figure 17:
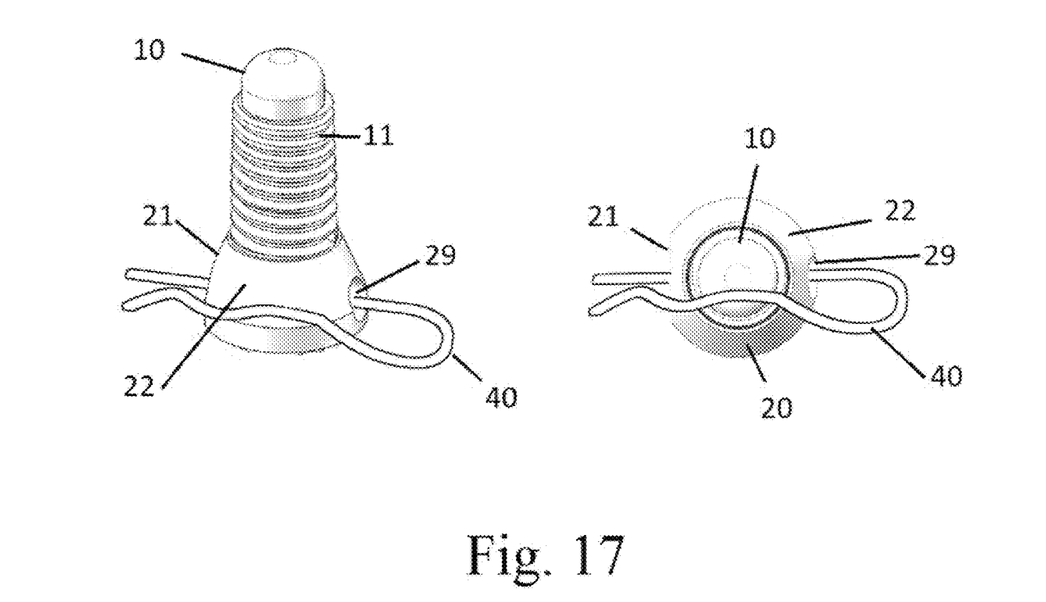
FIG. 17 shows a view of the threaded bolt with a clip with a bolt block with one flat side.

Another view of the nut 30 and the bolt 10 is shown in FIG. 17.

Figure 16:
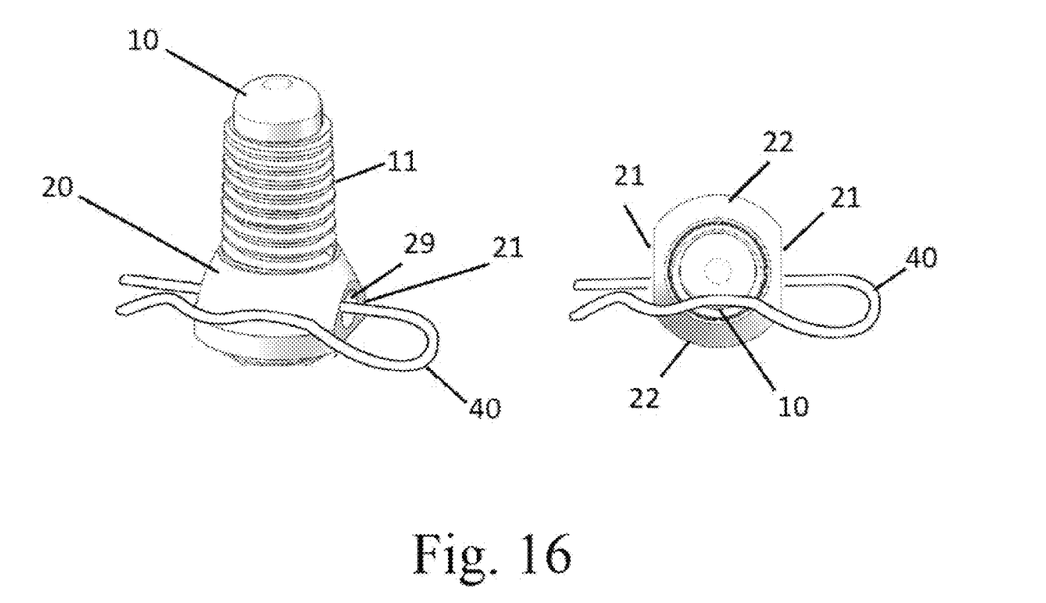
FIG. 16 shows a view of the threaded bolt with a clip with a bolt block with two flat sides.
Figure 18:
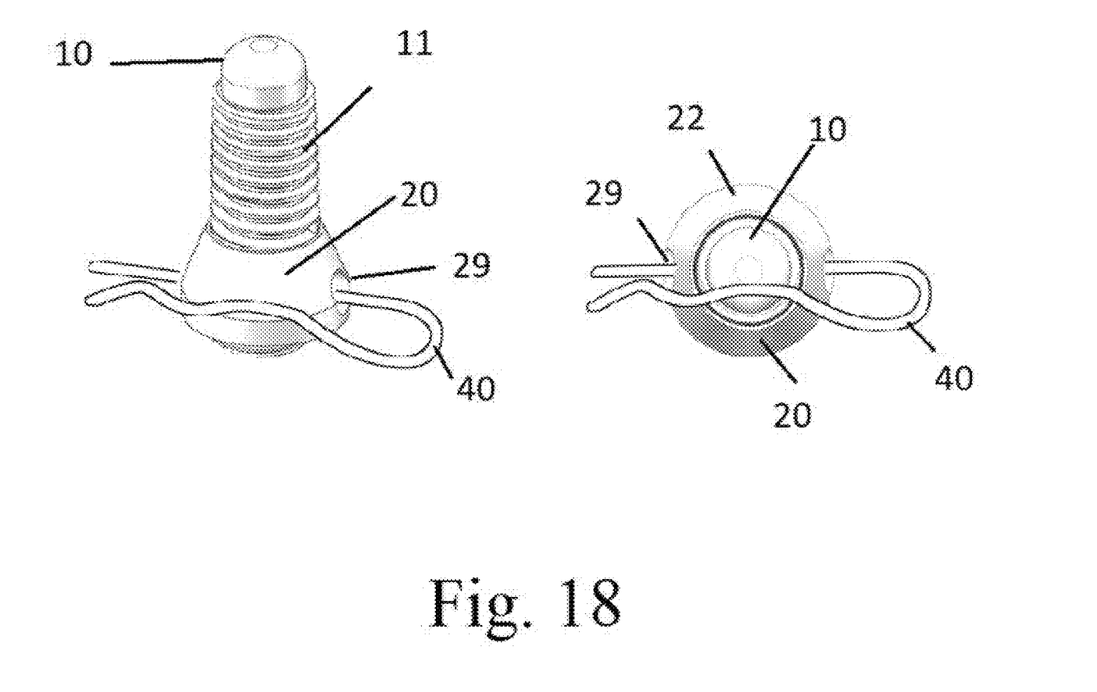
FIG. 18 shows a view of the threaded bolt with a clip.

Additional embodiment can be used to secure outer side of the door rim 510. As shown in FIGS. 16, 17 and 18 a clip 40 can be used. The clip 40 is placed in the bolt block 20 through a bolt block clip opening 29 that is positioned at a position to hold the door 100 in place. FIG. 18 shows the bolt block 20 with two flat sides, FIG. 19 shows a view of the threaded bolt 10 with a clip 40 with a bolt block 20 with one flat side and FIG. 20 shows a view with the threaded bolt 10 with a bolt block 20 with no flat sides.

Figure 19:
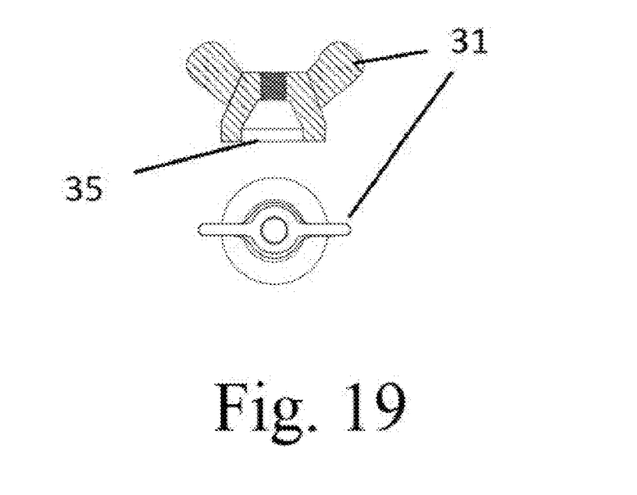
FIG. 19 shows a threaded wing nut.

FIG. 19 shows the nut as a winged nut 31.

The various features associate with the examples described herein and shown in the accompanying drawings can be implemented in different examples and implementations without departing from the scope of the present disclosure. Therefore, although certain specific constructions and arrangements have been described and shown in the accompanying drawings, such embodiments are merely illustrative and not restrictive of the scope of the disclosure, since various other additions and modifications to, and deletions from, the described embodiments will be apparent to one of ordinary skill in the art.

The invention claimed is:

1. A vehicle door alignment pin comprising:
   a cylinder bolt with a bolt block positioned in the center of the bolt with a threaded top that extends up from a vehicle hinge, the bolt block has two flat sides and two rounded sides with a flat bottom where rounded sides angles upward and inward, having a nut with a threaded opening and a recessed area in the bottom where the recessed area in the bottom is the shape that can cover the bolt block.

2. The vehicle door alignment pin according to claim 1 further comprising:
   where the recessed area in the bottom is the shape of rounded sides of the bolt block.

3. The vehicle door alignment pin according to claim 1 further comprising:
   where the nut will be the same thread size as the threaded top.

4. A process for securing and removing a detachable door from a vehicle using the device of claim 1.

5. The process according to claim 4 further comprising:
   having a nut with a recessed area where the recessed area in the bottom is the shape of rounded sides of the bolt block.

6. The process according to claim 4 further comprising:
   where the nut will be the same thread size as the threaded top.

* * * * *